United States Patent [19]
Barton

[11] Patent Number: 5,398,981
[45] Date of Patent: Mar. 21, 1995

[54] SELF-CENTERING, SELF-SEATING, DOUBLE-SEALING, INTEREFERENCE FIT TUBE JOINT

[75] Inventor: Bobby L. Barton, Camdenton, Mo.

[73] Assignee: Modine Manufacturing Company, Racine, Wis.

[21] Appl. No.: 636

[22] Filed: Jan. 4, 1993

[51] Int. Cl.⁶ ............................................. F16L 13/14
[52] U.S. Cl. ................................. 285/382; 285/382.2; 285/399
[58] Field of Search ............... 285/382, 382.4, 399, 285/214, 382.1, 382.2; 29/525, 520, 521; 403/282, 280, 15; 228/173.4

[56] References Cited

U.S. PATENT DOCUMENTS

| | | | |
|---|---|---|---|
| 611,959 | 10/1898 | Duvall | 285/214 |
| 1,417,396 | 5/1922 | Lassiter | 285/382 |
| 2,926,940 | 3/1960 | Maass | 29/525 |
| 2,946,610 | 7/1960 | Jenness | 403/15 |
| 3,301,576 | 1/1967 | Vigneron | 285/332 |
| 3,425,719 | 2/1969 | Burton | 285/382.2 |
| 3,466,066 | 9/1969 | Dawson | 285/332 |
| 3,466,738 | 9/1969 | Mount | 285/382.4 |
| 3,508,773 | 4/1970 | Coberly et al. | 29/525 |
| 4,076,167 | 2/1978 | Wright | 228/173.4 |
| 4,152,818 | 5/1979 | Mort | 285/382.4 |
| 4,302,874 | 12/1981 | Colas | 29/525 |
| 4,389,134 | 6/1983 | Colas | 29/525 |
| 4,769,897 | 9/1988 | Moseman | 285/382 |
| 4,796,927 | 1/1989 | Bona et al. | 285/382.4 |
| 4,886,392 | 12/1989 | Iio | 403/282 |

FOREIGN PATENT DOCUMENTS

| | | | |
|---|---|---|---|
| 1423295 | 1/1965 | France | 285/382 |
| 435700 | 9/1935 | United Kingdom | 29/525 |
| 866230 | 4/1961 | United Kingdom | 285/382.4 |
| 2106606 | 4/1983 | United Kingdom | 285/382 |

*Primary Examiner*—Eric K. Nicholson
*Attorney, Agent, or Firm*—Wood, Phillips, VanSanten, Clark & Mortimer

[57] ABSTRACT

The step of soldering, brazing, or welding a tube joint may be eliminated in a tube joint construction that includes a male tube member (10) having a first cylindrical section (14) of relatively lesser diameter and an adjacent, second cylindrical section (18) of relatively larger diameter. Also included is a female joint element (12) having an internal passage (30) which includes an emerging cylindrical section (32) of a diameter just less than the relatively larger diameter and an adjacent, interior cylindrical section (34) of a diameter just less than the relatively lesser diameter. The male tube member (10) is interference fitted into the female joint element (12) to provide a sealed joint without the need for soldering, brazing, or welding.

10 Claims, 1 Drawing Sheet

SELF-CENTERING, SELF-SEATING, DOUBLE-SEALING, INTEREFERENCE FIT TUBE JOINT

FIELD OF THE INVENTION

This invention relates to tube joints, and more specifically, to an interference fit tube joint that is self-centering, self-seating and seals in two distinct locations.

BACKGROUND OF THE INVENTION

A rather common place assembly procedure is the connecting of one fluid conduit to another for any of a variety of reasons. The connections are, of course, intended to assure that the fluid being contained within the conduit will not leak from the joint.

All manner of couplings, joints, etc. having widely varying characteristics have been devised for use in these assembly procedures. The specific characteristics of any given joint depend in a large part on the nature of the fluid being contained within the conduit as well as the intended pressure thereof.

In some instances, the manufacture of a relatively simple product may require the formation of a large number of fluid tight joints. For example, in the manufacture of some types of heat exchangers, a series of straight tubes impale plate fins. The tubes frequently are connected to convey a heat exchange fluid through the tubes in a serial arrangement and in such a case, U-shaped tubes are located on opposite ends of the heat exchanger core formed by the tubes and the plate fins and are joined to two adjacent tubes to direct fluid emerging from one into the other.

These joints must be provided at each end of each tube in the heat exchanger for a total of two joints per tube. In the usual case, the heat exchanger will include at least 30 tubes (and in some instances, in excess of 100) so there are a large number of joints involved. And, of course, each joint represents a potential leakage site.

Heretofore, the joints have been soldered, brazed, or welded after the conduits were physically assembled together to provide a leak-free joint. Given the large number of joints involved in a typical heat exchanger of this sort, it can be seen that the soldering, brazing, or welding process materially adds to the cost of assembly of the heat exchanger.

The present invention is directed to overcoming one or more of the above problems.

SUMMARY OF THE INVENTION

It is the principal object of the invention to provide a new and improved tube joint. More specifically, it is an object of the invention to provide a tube joint that will seal upon assembly and without the need for a subsequent soldering, brazing, or welding operation to achieve the seal. An exemplary embodiment of the invention achieves the foregoing object in a construction including a male joint element which includes a first tube end terminating in a reduced dimension section separated by a tapered section from a part of the tube of larger dimension than the reduced dimension section. Also provided is a female joint element made-up of a second tube end having a cross sectional shape that is geometrically similar to that of the first tube end and which terminates in an interior passage having an inner dimension just less than the larger dimension and extends to a lesser dimension section having an inner dimension just less than the reduced dimension. A tapered interior section interconnects the interior passage and the lesser dimension section. The first tube end is interference fitted into the second tube end with the lesser dimension receiving the reduced dimension section and the interior passage receiving the large dimension part.

According to the invention, interference fits are present between the lesser dimension section and the reduced dimension section on the one hand as well as between the interior passage and the larger dimension part on the other. Seals are thus provided in both of these areas. In a preferred embodiment, the tapered sections have substantially the same taper angle and are in substantial abutment with one another. Thus, the tapered surface within the female joint element serves as a seat for the tapered section of the male joint element.

In a highly preferred embodiment, the second tube end is flared. Thus, the flared end serves as a pilot for the reduced dimension section of the male joint element to provide for self alignment.

In a highly preferred embodiment, the tube joint includes a male tube member including a first cylindrical section of relatively lesser diameter and an adjacent, second cylindrical section of relatively larger diameter. A female joint element has an internal passage including an emerging cylindrical section of a diameter just less than the relatively larger diameter and an adjacent, interior cylindrical section of a diameter just less than the relatively lesser diameter. The male tube member is interference fitted into the female joint element.

According to this embodiment, in a highly preferred form of the invention, the female joint element is also a tube end.

Preferably, the female joint element has an end surface whereat the passage emerges and the passage, at its interface with the surface is flared.

In one embodiment, the first and second cylindrical sections are connected by a frusto-conical section and the emerging cylindrical section and the interior cylindrical section are also joined by a frusto-conical surface.

In a highly preferred embodiment, the cone angles of the frusto-conical section and surface are the same.

Other objects and advantages will become apparent from the following specification taken in connection with the accompanying drawings.

DESCRIPTION OF THE PREFERRED EMBODIMENT

Figure 1:
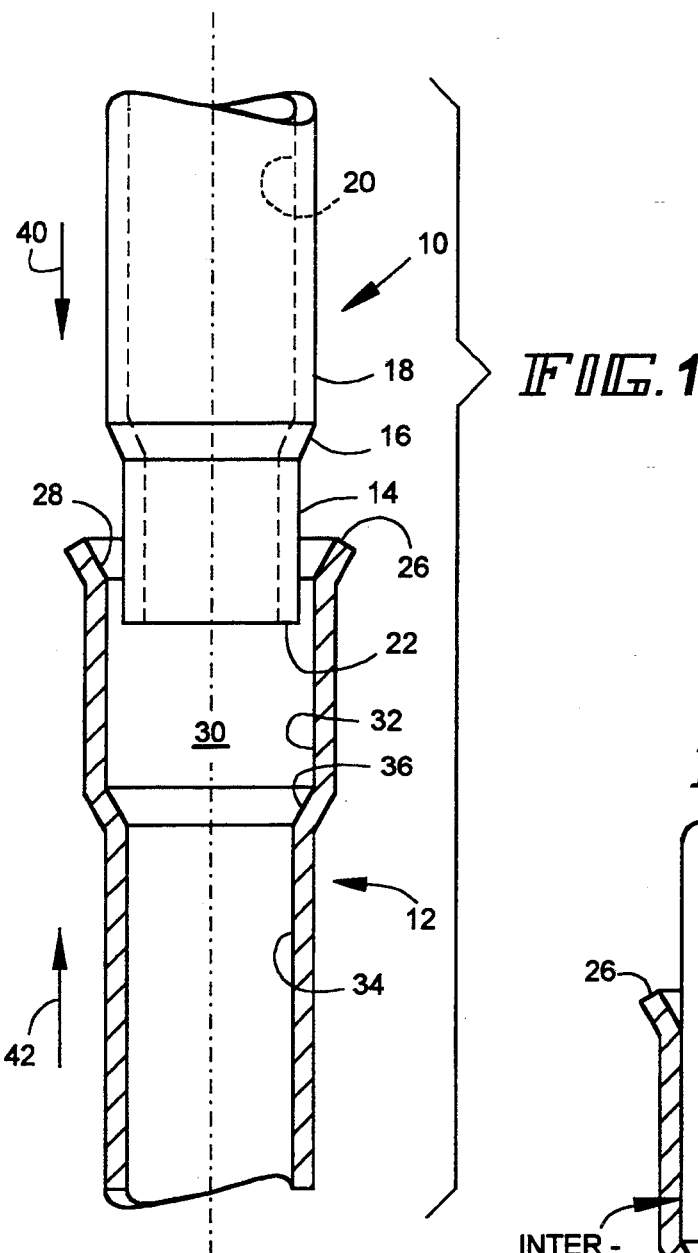
FIG. 1 is an exploded view of a tube joint made according to the invention.
Figure 2:
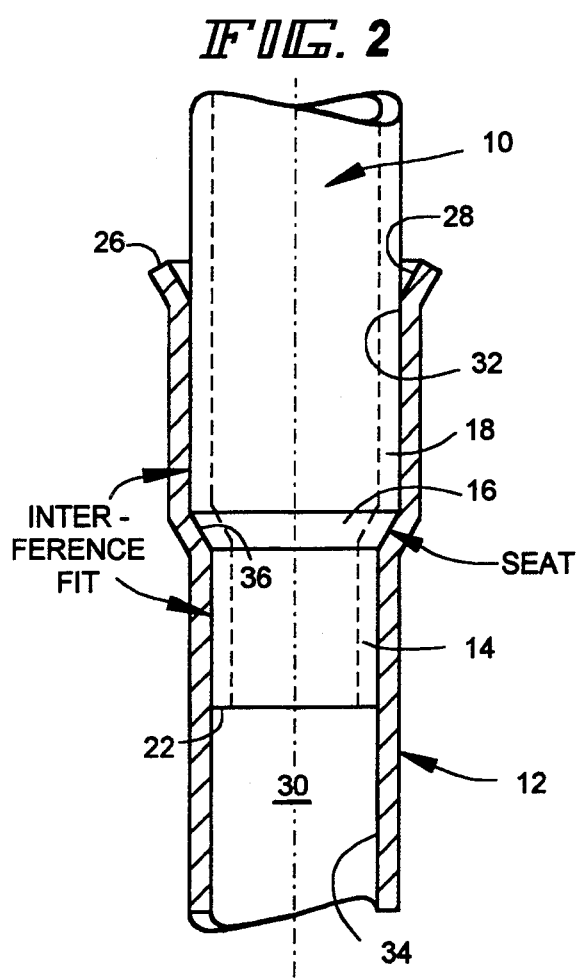
FIG. 2 illustrates an assembled tube joint.

An exemplary embodiment of the invention is illustrated in the drawings and with reference to FIG. 1 is seen to include two basic components. A first is a male tube end 10 while a second is a female tube end, generally designated 12. The ends 10 and 12 may be formed of any suitable material but typically, in a heat exchanger type of usage, stainless steel would be the material of choice.

The male tube end 10 is a stepped cylindrical tube having an end most section 14 connected by a frusto-conical section 16 to a larger diameter section 18. Typically, the larger diameter section 18 of the tube will be of the diameter of the tube along the entirety of its length. The reduced diameter section 14 may be formed by cold working. In the preferred embodiment, the tube end 10 will have a circular cross section with a consequence that the sections 14 and 18 will be cylindrical, albeit of differing diameter.

As is typical of a tube, the tube end 10 includes an internal passage 20 which opens at the tube end 22.

The female tube end 12 has an end surface 26 at the end of a slightly flared section 28. The flared section 28 extends inwardly and about the interior tube passage 30. The tube passage 30, immediately adjacent the flared section 28, includes a relatively large diameter, inner cylindrical surface 32. Adjacent to the large diameter surface 32 is a reduced diameter, cylindrical interior surface 34. The two are connected by a frusto-conical surface 36.

According to the invention, the outer diameter of the section 18 of the male tube end 10 is slightly greater than the diameter of the surface 32. Similarly, the outer diameter of the section 14 is slightly greater than a diameter of the surface 34.

It is also preferred that the cone angle of the frusto-conical section 16 be equal to the cone angle of the frusto-conical surface 36.

As a consequence of this construction, the male tube end 10 may be moved in the direction of an arrow 40 toward the female tube end 12 or the female tube end 12 moved in the direction of an arrow 42 toward the male tube end 10, or both.

If the tube ends 10 and 12 are properly aligned, the end surface 22 of the male tube end 10 will enter the passage 30 within the female tube end 12. If there is some misalignment, the end 22 will nonetheless enter the passage 30 and ultimately contact the frusto-conical surface 36 which will exert a camming action on the tube end 10 to center the same with respect to the center line of the female tube end 12. If there is an even greater degree of misalignment, the end 22 will encounter the flared section 28 on the female tube end 12 which will act to cam the end 22 into the passage 30.

Because of the relationship of the diameters of the various sections, upon continued insertion of the male tube end 10 into the female tube end 12, the section 14 will encounter the slightly smaller diameter surface 34 while the section 18 will encounter the slightly smaller diameter surface 32. As a consequence, an interference fit will materialize as the male end 10 is further moved into the female end 12. Ultimately, the frusto-conical section 16 will seat against the frusto-conical surface 36 halting further insertion of the male tube end 10 into the female tube end 12.

At this point, the interference fit existing between the section 14 and the surface 34 on the one hand and the section 18 and the surface 32 on the other results in seals being established at these locations. Thus, two seals will exist at two axially spaced locations along the length of the joint.

In addition, the frusto-conical surface 36 acts as a seat for the frusto-conical section 16 preventing excess insertion and yet providing a positive indication that the assembly of the tube end 10 to the tube end 12 is complete by resisting further insertion.

As noted previously, the tube ends may be cold formed using a series of dies to form and size each end to relatively precise dimensions sufficient to achieve the desired interference fit.

As a consequence of this construction, it will be seen that the invention provides a joint that will be leak-tight at the relatively low fluid pressures encountered in a variety of assemblies such as certain types of heat exchangers. The leak proof nature of the joint is accomplished without any soldering, brazing, or welding operation and is formed by the simple act of assembling one tube end to the other, an operation that must be performed in any event. Thus, through the use of the invention, a soldering, brazing, or welding step is eliminated entirely, with the assembly step of assembling one tube end to another additionally achieving a seal simultaneously with the assembly.

Further, the self-alignment feature assures ease of assembly.

While the invention has been described in connection with tube ends of circular cross section, it will be appreciated that the invention is not so limited. Rather, it is only necessary that the passage 30 have a cross section that is similar in the geometric sense to the cross section of the male tube end 10. The joint may also find applicability as a tube joint where the element 12 is not a tube end at all but may be any other instrumentality provided with an internal passage such as the passage 30, for receipt of a tube to form a tube joint.

I claim:

1. A tube joint comprising:
   A male joint element comprising a first tube end terminating in a reduced dimension section separated by a tapered section from a part of the tube of larger dimension than said reduced dimension section; and
   A female joint element comprising a second tube end having a cross sectional shape that is geometrically similar to that of said first tube end and terminating in an interior passage having an inter dimension just less than said larger dimension and extending to a lesser dimension section having an inner dimension just less than said reduced dimension section, and a tapered interior section interconnecting said interior passage and said lesser dimension section;
   said first tube end being interference fitted into said second tube and sealed thereto with said lesser dimension section sealingly receiving said reduced dimension section and said interior passage sealingly receiving said larger dimension part; the seals between said first tube end and said second tube end being produced solely by said interference fit.

2. The tube joint of claim 1 wherein said tapered sections have substantially the same angle and are in substantial abutment with one another.

3. The tube joint of claim 2 wherein said second tube end is flared.

4. The tube joint of claim 1 wherein said second tube end is flared.

5. A sealed tube joint comprising:
   A male tube member including a first cylindrical end of relatively lesser diameter and an adjacent, second cylindrical section of relatively larger diameter; and
   A female joint element having an internal passage, including an emerging cylindrical section of a diameter just less than said relatively larger diameter and an adjacent, interior cylindrical section of a diameter just less than said relatively lesser diameter;
   Said male tube member being interference fitted into said female joint element to form a joint sealed by said interference fit at each of said diameters.

6. The tube joint of claim 5 wherein said female joint element is a tube end.

7. The tube joint of claim 5 wherein said female joint element has an end surface whereat said passage emerges; said passage, at its interface with said surface, being flared.

8. The tube joint of claim 5 wherein first and second cylindrical sections are connected by a frusto-conical section and said emerging cylindrical section and said interior cylindrical section are joined by a frusto-conical surface.

9. The tube joint of claim 8 wherein the cone angles of said frusto-conical section and said frusto-conical surface are the same.

10. A self-centering, self-seating, double-sealing, interference fit tube joint comprising:
 a first tube of circular cross section and terminating in a stepped end of two differing diameters with the smallest diameter being immediately adjacent the end and with the two diameters being separated by a tapered section; and
 a second tube of circular cross section and terminating in a flared end about a stepped internal passage of two differing diameters with the larger diameter being immediately adjacent the flared end, the differing diameters of said passage being separated by a tapered surface and being slightly smaller than the corresponding diameters of said stepped end;
 the tapers of said tapered section and said tapered surface being complementary;
 said first tube stepped end being received in said second tube stepped internal passage in interference fit relation to form a joint sealed at each of said diameters with said tapered section being seated against said tapered surface.

* * * * *